(12) United States Patent
Madore

(10) Patent No.: US 7,669,346 B2
(45) Date of Patent: Mar. 2, 2010

(54) ENCODER HUB TO DISC ATTACHMENT METHOD AND APPARATUS

(75) Inventor: David M. Madore, Vancouver, WA (US)

(73) Assignee: USDigital LLC, Vancouver, WA (US)

( * ) Notice: Subject to any disclaimer, the term of this patent is extended or adjusted under 35 U.S.C. 154(b) by 101 days.

(21) Appl. No.: 12/060,241

(22) Filed: Mar. 31, 2008

(65) Prior Publication Data

US 2008/0307665 A1    Dec. 18, 2008

Related U.S. Application Data

(60) Provisional application No. 60/920,883, filed on Mar. 30, 2007, provisional application No. 60/943,261, filed on Jun. 11, 2007.

(51) Int. Cl.
   *G01D 5/347*    (2006.01)
(52) U.S. Cl. .......................................... 33/707; 33/1 PT
(58) Field of Classification Search ................. 33/1 PT, 33/1 N, 706, 707, 708; 250/231.13
   See application file for complete search history.

(56) References Cited

U.S. PATENT DOCUMENTS

| | | | | |
|---|---|---|---|---|
| 4,556,792 | A * | 12/1985 | Kano et al. | 250/231.14 |
| 5,835,303 | A * | 11/1998 | Morehouse et al. | 360/97.01 |
| 6,332,942 | B1 * | 12/2001 | Hector et al. | 156/273.7 |
| 6,457,245 | B1 * | 10/2002 | Hoskins | 33/1 PT |
| 6,536,267 | B2 * | 3/2003 | Kieselbach | 73/115.07 |
| 6,584,067 | B2 * | 6/2003 | Oshima et al. | 720/724 |
| 6,891,150 | B2 * | 5/2005 | Takayama et al. | 250/231.13 |
| 7,026,734 | B2 * | 4/2006 | Braun | 250/231.13 |
| 7,176,449 | B2 * | 2/2007 | Shahbazi et al. | 250/231.13 |
| 7,215,509 | B2 * | 5/2007 | Ng | 360/99.12 |
| 7,392,588 | B2 * | 7/2008 | Brandl | 33/1 PT |
| 7,549,390 | B2 * | 6/2009 | Verdouw | 116/288 |
| 2002/0057530 | A1 * | 5/2002 | Lalouette | 360/135 |
| 2005/0195524 | A1 * | 9/2005 | Choo et al. | 360/99.08 |
| 2009/0109514 | A1 * | 4/2009 | Liao et al. | 359/230 |

FOREIGN PATENT DOCUMENTS

| | | | |
|---|---|---|---|
| JP | 03296978 A | * | 12/1991 |
| JP | 10141998 A | * | 5/1998 |
| JP | 2000329584 A | * | 11/2000 |
| JP | 2008002970 A | * | 1/2008 |

\* cited by examiner

*Primary Examiner*—R. A. Smith
(74) *Attorney, Agent, or Firm*—PatentForge

(57) ABSTRACT

An annular having a central bore includes a conical surface concentric with the bore such that the conical surface has a peak, an inner trough and an outer lip and the inner trough is adjacent to the central bore. A retention groove located under the outer lip has an outside diameter that is less than the lip outside diameter. A tapered reflective face extends outward from the retention groove. When a code wheel disc having an inside diameter that is smaller than said lip outside diameter is pressed onto the conical surface, the difference in size of the lip outside diameter and the disc inside diameter promotes a deflection of the disc which forces it to conform to the tapered reflective surface.

20 Claims, 4 Drawing Sheets

ENCODER HUB TO DISC ATTACHMENT METHOD AND APPARATUS

This application claims priority to U.S. Provisional Application No. 60/920,883 titled "Optical Encoder Components", filed Mar. 30, 2007, incorporated herein by reference and to U.S. Provisional Application No. 60/943,261, titled "Inclinometers", filed Jun. 11, 2007, incorporated herein by reference.

BACKGROUND OF THE INVENTION

1. Field of the Invention

The present invention relates to optical encoder components, and more specifically, it relates to reflective codewheel disc optical encoder manufacturing technology 2. Description of Related Art Rotary encoders fulfill a multitude of consumer and industrial applications from acting as infinitely rotating dials on stereos and other human input devices to acting as feedback loops for motors that drive equipment demanding positional accuracy. There are a variety of styles of rotary encoder which are established as prior art. While some encoders utilize mechanical contact mechanisms similar to that of a brushed motor in order to send varying signals to a device, others utilize magnetic fields to send constantly varying analog signals as an output. The style of encoder discussed herein is a third type referred to an optical encoder, which is a device that utilizes a lighting source, a code wheel disc and a sensor to decipher the interruptions of the lighting source that are established during its interaction with the code wheel disc. Of optical encoders, there are two common types that establish the prior art. One of these types is a transmissive system that locates the light source on one side of a code wheel disc and the sensor on the other side of the code wheel disc. In this style of optical encoder, the code wheel disc may be a translucent mylar with opaque markings on its surface to block the transmission of the light source through the substrate, or it may be another mechanism such as an opaque plastic disc with cutaway gaps that allow the light signals to transmit through the gaps effecting the sensor. Another common type of optical encoder is that of the reflective code-wheel disc optical encoder, which employs a code-wheel disc which has a series of reflective and non-reflective patterns on its surface. Opposite that surface are both the light source and the sensor, arranged in a way in which the light source focuses on the surface of the code wheel disc in a fashion that reflects back toward the sensor when the wheel is oriented in a position where the reflective sections of code pattern interact with the light source. The pattern which is chosen in any optical rotary encoder can provide either an incremental or absolute position of the shaft to which the encoder codewheel is attached. FIG. 1 shows a prior art reflective code wheel design. A reflective mylar code-wheel disc 16 is embedded between glass discs 12 and 14. Reflective codewheel disc 16 is attached to hub 18 via retaining washer 10.

SUMMARY OF THE INVENTION

It is an object of the present invention to provide an encoder hub to disc attachment method and apparatus.

This and other objects will be apparent based on the disclosure herein.

In order to advance the state of the art in regard to manufacturability of rotary encoders which use reflective type code wheel discs, a mechanical mechanism is devised to attach a single piece, e.g., mylar code-wheel disc onto, e.g., a single piece aluminum collet style push on retaining hub. Biaxially-oriented polyethylene terephthalate (boPET) polyester film is used for its high tensile strength, chemical and dimensional stability, transparency, reflective, gas and aroma barrier properties and electrical insulation. A variety of companies manufacture boPET and other polyester films under different trade names. In the US and Britain, the most well-known trade names are Mylar and Melinex. The method of attachment between the mylar disc and the aluminum hub is one in which the hole cut into the interior of the mylar is pressed over a conical surface which is integral lo and concentric to the bore of the hub. Beneath the conical surface of the hub lies an undercut groove into which the interior edge of the mylar code wheel disc snaps. The difference in size of the conical surface on the hub and the bore of the mylar disk promotes a deflection of the mylar which forces the mylar to conform to a tapered reflective surface on the hub. This methodology allows for a simple assembly process which does not require any further assembly mechanisms or intermediate materials to achieve the optimal reflectivity required for a reflective style encoder. Concurrently, the deflection and snap fit of the mylar into the undercut notch on the hub provides a positive retaining mechanism both in the radial and axial orientations of the assembly. FIG. 2A shows a flat mylar disc 112 prior to attachment to a hub according to the present invention. FIG. 2B shows the deflection of the mylar disc 112 of FIG. 2A after attachment to a hub according to the present invention.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

One of the critical elements of encoder design is the concentricity between the optical radius of the code wheel disc artwork pattern and the shaft to which it's hub is attached. As the optical radius of the artwork pattern deviates radially as rotated from the sensor focus, the arc minute error of the encoder output increases. Because of this concern, most hub to disc attachment methods utilize arduous processes that align and bond the code wheel disc to the hub to achieve said concentricity. Generally, this requirement precludes the use of a code wheel disk that is press fit onto a hub for high accuracy requirements. Unlike prior art, the press fit nature of the conical alignment surface of the present invention allows for nearly perfect concentricity of the hub to the disk without requiring the use of mechanisms that test the encoder output while the fixing agent is being applied to the disc and hub.

Likewise, the rigidity between the artwork pattern containing code wheel disc and the hub to which it is attached is very demanding as any shift in the location of the disc relative to the hub will result in an equal amount of incorrect encoder signal. In the state of the art design discussed, the press fitting of the disc onto the hub, snapping into place on the undercut land of the hub and angular surface tension between mylar and reflective surface prevents rotation of disk relative to hub. This surface tension also prevents the corrosion of the surface aluminum to promote the reflective system for the longevity of the device.

Finally, in applications using reflective technology, the moire pattern that results from any gap between the artwork emulsion on the mylar disc and the reflective surface of the hub itself, results in a direct attenuation of the digital output signal of the encoder. To overcome this design requirement, the process of pressing the disc onto the hub over a constantly increasing conical form promotes a plastic deformation of the mylar disc, in effect 'oil-canning' the structure of the mylar. Upon the inside diameter of the mylar disc snapping into place in the undercut of the hub, that deformation in the form of the mylar disc snaps the emulsion (artwork) side of the disc down onto the reflective angular surface of the hub. Unlike many applications where this 'oil-canning' of a thin material may result in rapid fluctuation from convex to concave form, the mylar is retained in the ring in a manner that constantly applies the requisite pressure on the hub to promote repeatable adhesion to the reflective surface of the hub. If the mylar is pried up from the reflective surface, it immediately snaps back down when pressure is released from the underside of the mylar surface.

Figure 1:
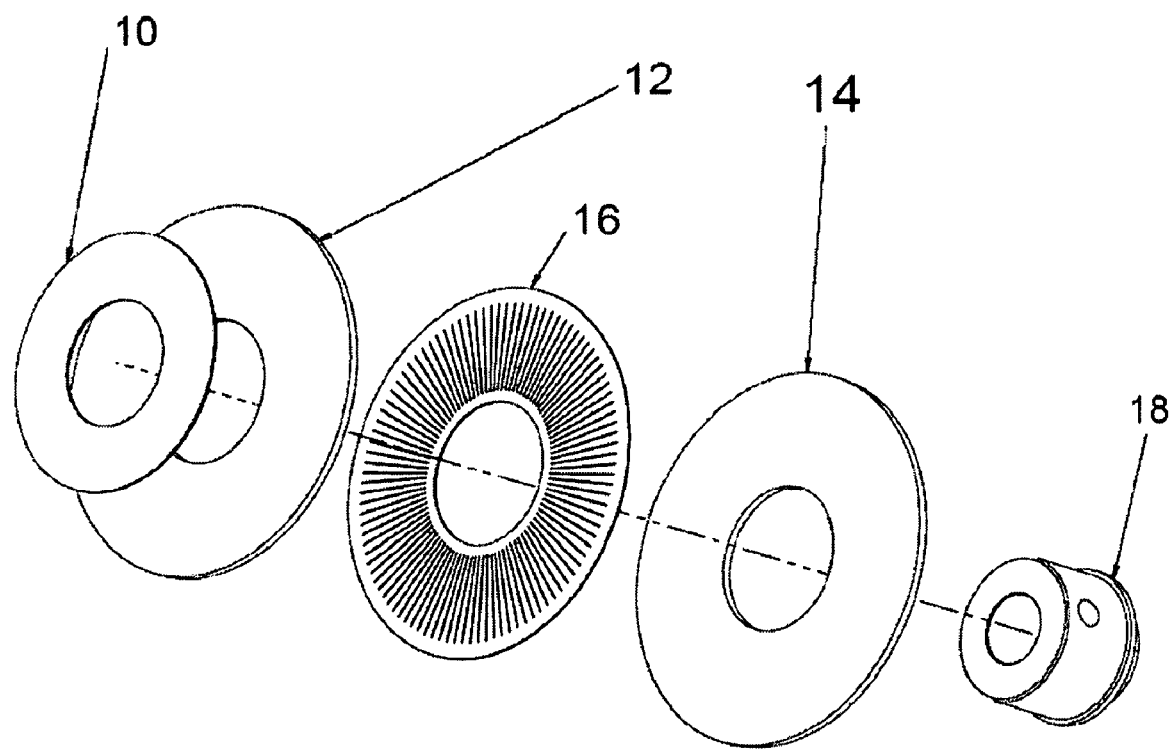
FIG. 1 shows a prior art laminated glass style reflective hub-disc assembly.
Figure 2A:
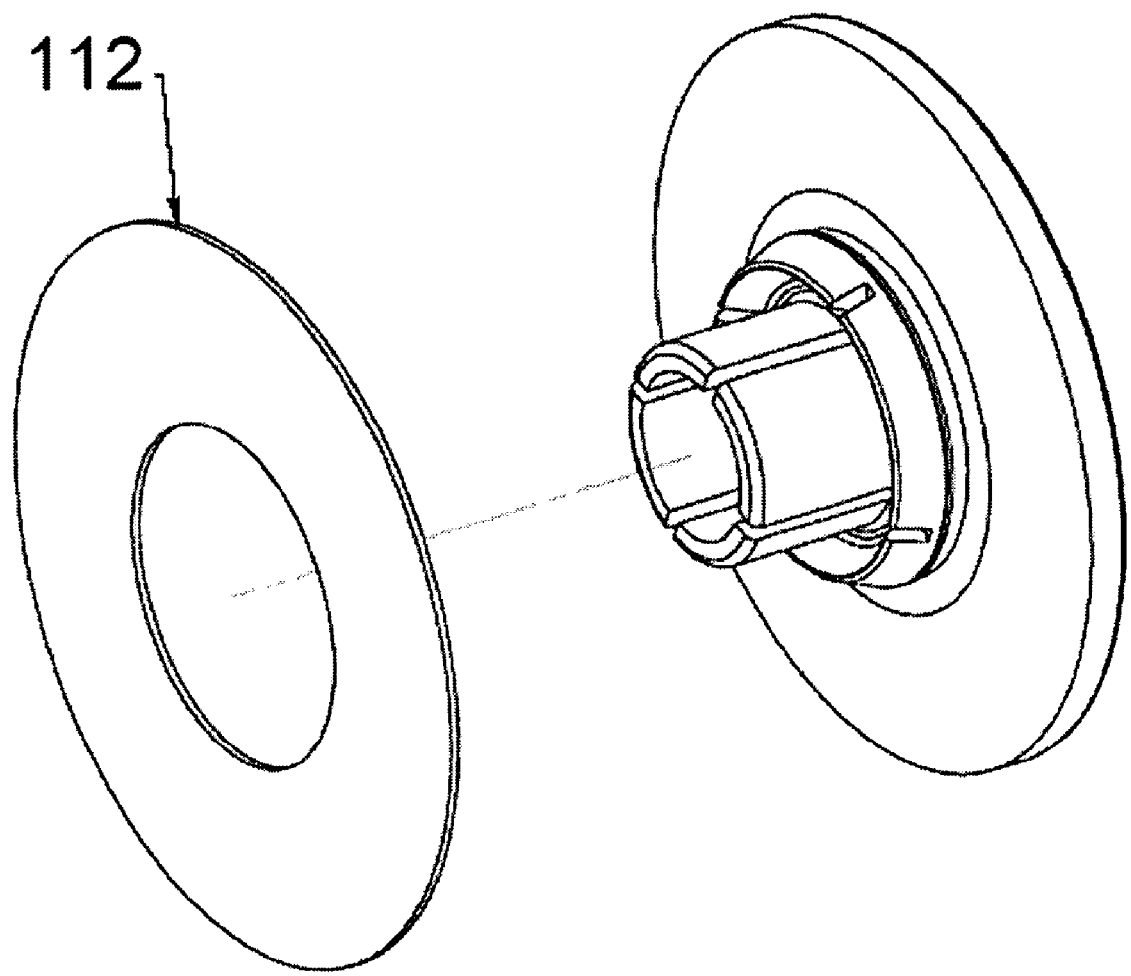
FIG. 2A shows a flat mylar disc prior to attachment to a hub according to the present invention.
Figure 2B:
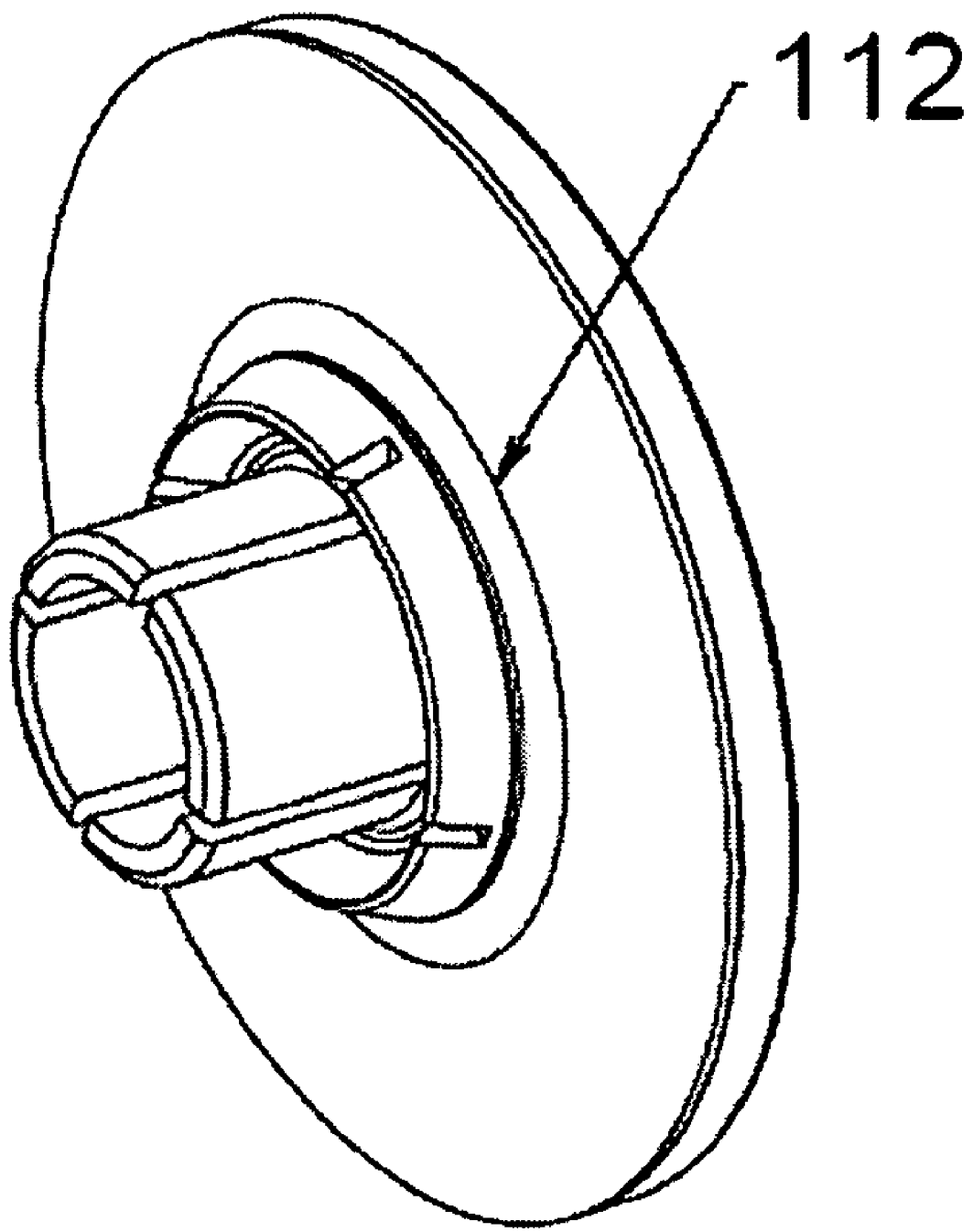
FIG. 2B shows the deflection of the mylar disc of FIG. 2A after attachment to a hub according to the present invention.
Figure 3:
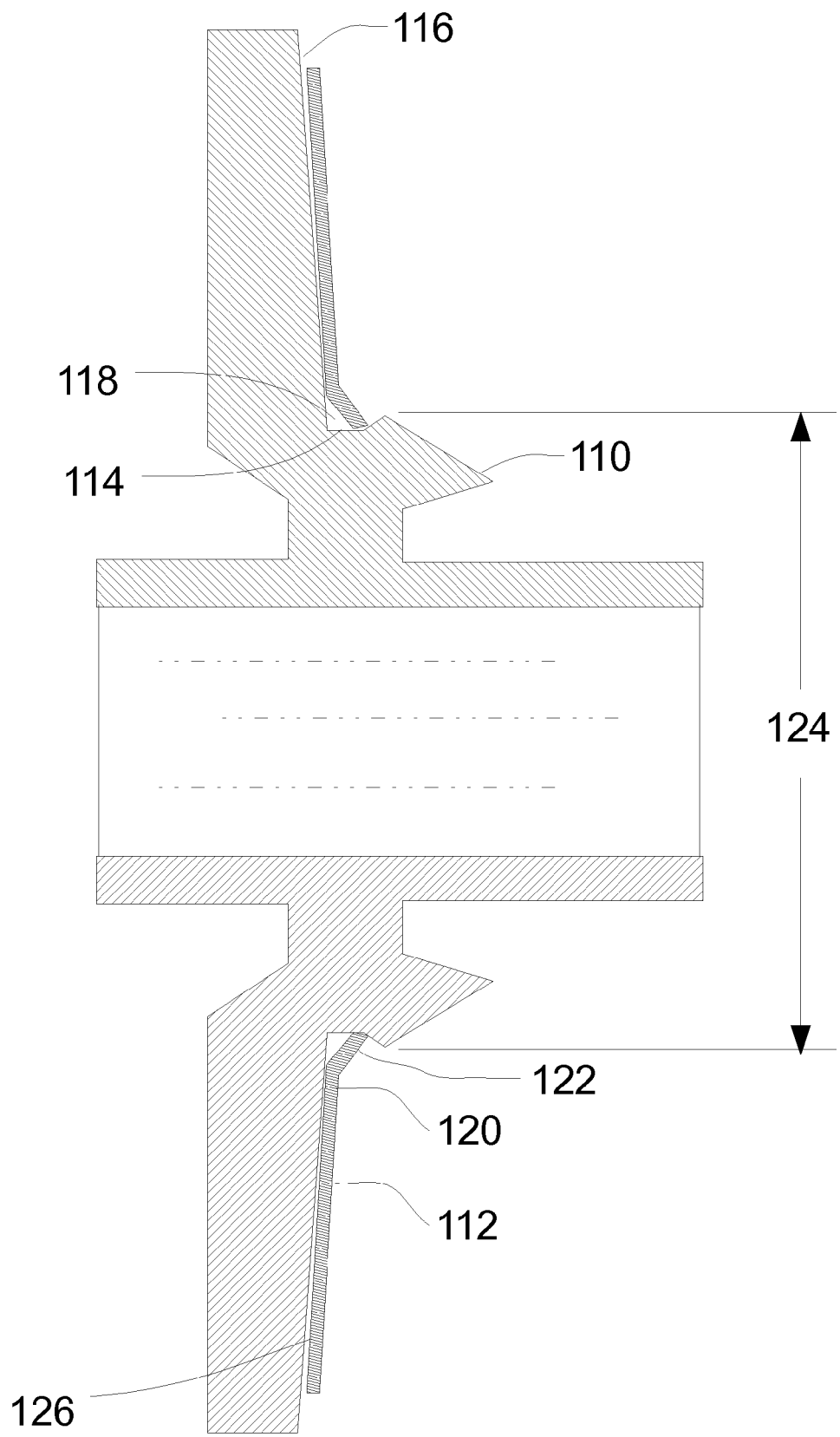
FIG. 3 shows a cross sectional diagram of an embodiment of the present invention in which a single piece mylar codewheel disc is attached onto a single piece aluminum collet style push on retaining hub.

As exemplified by the embodiment shown in FIG. 3, conical face 110 concentrically aligns and expands the mylar code wheel disc 112 relative to the hub bore. This active expansion produced on disc 112 by the inside diameter of the mylar hub at face 110 promotes a snap back retention of the mylar code wheel disc 112 into the retention groove 114. The act of expanding the inside diameter of the mylar disc 112 serves as a method to plastically deform the mylar, which results in a state in which the mylar seeks to form a slight conical shape, similar to that of the tapered reflective face 116. Due to the angle of the tapered surface being slightly less than the form that the deflected mylar disc is attempting to create, the disc 112 snaps to the surface, creating a surface tension that both promotes a clear reading of the code wheel design side of the mylar disc and simultaneously protects the highly reflective mirror finish of the aluminum hub at the tapered reflective face 116. The clearance relief 118 incorporated in the retention groove 114 keeps the mylar disc 112 from oilcanning from one orientation to another. Permanent deformation of the mylar material at points near reference number 120 results in constant pressure of the mylar to the tapered surface Active expansion of the inside diameter of the mylar disc promotes retention to the groove diameter. See for example, points near reference number 122. In some embodiments it has been found beneficial to make the outside diameter 124 of the groove 114 to be within a range from about 0.005 to 0.014 inches over the inside diameter of the wheel disc. Usually the side 126 of code wheel disc 114 is adjacent to the tapered reflective face 116. Some embodiments of the tapered reflective face 116 have about a 3 degree taper with a tolerance of +3 degrees and −1 degree.

Although the code wheel disc material discussed above is a mylar film between 0.004 and 0.013 inch thick, there are a variety of materials which have applicability to this mechanical retention mechanism. Most notable are similar materials with optically transparent properties. Depending on application, acrylic or polycarbonate materials can be utilized to perform in a similar manner, deflecting over a conical form into a shallow groove reacting in a manner of plastic deformation which promotes mechanical adhesion to a tapered surface slightly less than equal to their deformation. Likewise, the design is easily scalable in the range of common encoder design, from 0.375" overall diameter to 5+" overall diameter.

In addition to incremental encoder applications, the mylar disc snap fit to hub design also works for absolute encoders as well as the potential to design a hub that has the conical centering surface, groove and angled reflective surface on both sides of the hub itself for dual output and high resolution applications.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:

1. An annular hub, comprising:
a central bore;
a substantially conical face with an outside diameter and concentric with said bore,
a retention groove under said conical face, wherein, as measured perpendicular to a centerline through said central bore, the retention groove inside diameter is less than the conical face outside diameter; and
a tapered reflective face extending radially outward from said retention groove.

2. The annular hub of claim 1, wherein said hub comprises aluminum.

3. The annular hub of claim 1, wherein said hub comprises a single piece aluminum collet style push on retaining hub.

4. The annular hub of claim 1, wherein said tapered reflective face comprises a taper of about 3 degrees.

5. The annular hub of claim 1, wherein said tapered reflective face comprises a taper within a range of about 2 degrees to about 6 degrees.

6. The annular hub of claim 1, further comprising a code wheel disc operatively attached to said hub.

7. The annular hub of claim 6, wherein said code wheel disc comprises boPET.

8. The annular hub of claim 6, wherein said code wheel disc comprises a polyester film.

9. The annular hub of claim 6, wherein said code wheel disc comprises acrylic.

10. The annular hub of claim 6, wherein said code wheel disc comprises polycarbonate material.

11. The annular hub of claim 6, wherein said code wheel disc comprises a reflective type code wheel disc.

12. The annular hub of claim 6, wherein said disc comprises a disc inside diameter that is smaller than said groove inside diameter.

13. The annular hub of claim 12, wherein the difference in size of said groove inside diameter and said disc inside diameter promotes a deflection of said disc which forces said disc to conform to said tapered reflective surface.

14. The annular hub of claim 12, wherein said groove inside diameter is within a range from about 0.005 to 0.014 inches greater than said disc inside diameter.

15. The annular hub of claim 6, wherein said code wheel disc is operatively attached to said hub such that said disc deflects and snaps into said retention groove with a positive retaining mechanism both in the radial and axial orientations of disc.

16. A method for attaching a code wheel disc to a hub, comprising:

providing a hub comprising:

a central bore;

a substantially conical face with an outside diameter and concentric with said bore;

a retention groove under said conical face, wherein, as measured perpendicular to a centerline through said central bore, the retention groove inside diameter is less than the conical face outside diameter; and a tapered reflective face extending radially outward from said retention groove; providing a code wheel disc that comprises a disc inside diameter that is smaller than said conical face outside diameter; and pressing said code wheel disc at said disc inside diameter onto said conical face and into said retention groove.

17. The method of claim 16, wherein said tapered reflective face comprises a taper of about 3 degrees.

18. The method of claim 16, wherein said code wheel disc comprises a reflective type code wheel disc.

19. The method of claim 16, wherein the difference in size of said retention groove inside diameter and said disc inside diameter promotes a deflection of said disc which forces said disc to conform to said tapered reflective surface.

20. The method of claim 16, wherein said code wheel disc is operatively attached to said hub such that said disc deflects and snaps into said retention groove with a positive retaining mechanism both in the radial and axial orientations of disc.

* * * * *